US008340855B2

(12) United States Patent
Chinnadurai et al.

(10) Patent No.: US 8,340,855 B2
(45) Date of Patent: Dec. 25, 2012

(54) USB ISOLATION FOR VEHICLE COMMUNICATION INTERFACE

(75) Inventors: Manokar Chinnadurai, Owatonna, MN (US); Kurt Raichle, Owatonna, MN (US); Paul Sontheimer, Waseca, MN (US)

(73) Assignee: SPX Corporation, Charlotte, NC (US)

( * ) Notice: Subject to any disclaimer, the term of this patent is extended or adjusted under 35 U.S.C. 154(b) by 1250 days.

(21) Appl. No.: 12/107,451

(22) Filed: Apr. 22, 2008

(65) Prior Publication Data

US 2009/0265057 A1 Oct. 22, 2009

(51) Int. Cl.

| | |
|---|---|
| ***G01M 17/00*** | (2006.01) |
| ***G06F 7/00*** | (2006.01) |
| ***G06F 11/30*** | (2006.01) |
| ***G06F 19/00*** | (2011.01) |
| ***G01C 5/00*** | (2006.01) |

(52) U.S. Cl. ............... 701/29.1; 701/33; 710/1; 710/11; 710/62; 710/72; 710/313; 370/401

(58) Field of Classification Search .................... 701/29, 701/33; 714/29, 47.1; 710/1, 11, 62, 72, 710/313; 370/401, 419, 463

See application file for complete search history.

(56) References Cited

U.S. PATENT DOCUMENTS 2,640,968 A 6/1953 Lehr
3,627,929 A 12/1971 Gilissen et al.
4,294,039 A 10/1981 Dalheimer et al.
4,392,661 A 7/1983 Langenstein
4,924,039 A 5/1990 McAllise et al.
D322,582 S 12/1991 Friedman
5,473,540 A 12/1995 Schmitz
5,491,418 A 2/1996 Alfaro et al.
5,687,081 A 11/1997 Wellman et al.
5,916,286 A 6/1999 Seashore et al.
5,916,287 A 6/1999 Arjomand et al.
5,936,315 A 8/1999 Lais
6,094,609 A 7/2000 Arjomand
6,115,681 A 9/2000 Foreman et al.
6,169,943 B1 1/2001 Simon et al.
6,360,145 B1 3/2002 Robinson
6,362,421 B1 3/2002 Layton, Jr.
6,370,603 B1 * 4/2002 Silverman et al. .............. 710/72
6,393,342 B2 5/2002 Bauer et al.
6,405,112 B1 6/2002 Rayner
6,438,472 B1 8/2002 Tano et al.
6,462,270 B1 10/2002 Depp et al.
6,476,320 B1 11/2002 Ritter et al.
6,515,226 B2 2/2003 Chiriku et al.
6,539,358 B1 3/2003 Coon et al.
6,586,674 B2 7/2003 Krause et al.
6,633,482 B2 10/2003 Rode
6,633,921 B1 * 10/2003 Pan ............................... 709/250
6,687,584 B2 2/2004 Andreasen et al.
6,693,367 B1 2/2004 Schmeisser et al.
(Continued)

*Primary Examiner* — Khoi Tran
*Assistant Examiner* — Jamie Figueroa
(74) *Attorney, Agent, or Firm* — Baker & Hostetler LLP

(57) ABSTRACT

The present invention relates generally to an automotive diagnostic tool which facilitates data communications between an automobile and diagnostic device, such as a personal computer. More particularly, the present invention relates to electrically isolating the data communications using a Vehicle Communication Interface (VCI) device situated between an automobile's communication diagnostic port and the personal computer. The VCI contains logic circuitry to translate the automobile's On Board Diagnostic (OBD II) signals to an embedded Ethernet controller. Ethernet signals are then non-galvanicly exchanged with an Ethernet to USB controller with an Ethernet transformer. A personal computer is attached via a USB cable to the VCI's Ethernet to USB Controller, permitting information exchange between the automobile and the personal computer.

25 Claims, 3 Drawing Sheets

U.S. PATENT DOCUMENTS

| | | | | |
|---|---|---|---|---|
| 6,711,162 | B1 * | 3/2004 | Ortega et al. | 370/389 |
| 6,728,603 | B2 | 4/2004 | Pruzan et al. | |
| 6,745,151 | B2 | 6/2004 | Marko et al. | |
| 6,757,600 | B2 | 6/2004 | Bachle | |
| 6,799,101 | B2 | 9/2004 | Hawig et al. | |
| 6,807,469 | B2 | 10/2004 | Funkhouser et al. | |
| 6,816,760 | B1 | 11/2004 | Namaky | |
| 6,823,243 | B2 | 11/2004 | Chinnadurai et al. | |
| 6,832,141 | B2 | 12/2004 | Skeen et al. | |
| 6,847,916 | B1 | 1/2005 | Ying | |
| 6,848,916 | B2 | 2/2005 | Nakayama et al. | |
| 6,859,696 | B2 | 2/2005 | Schade et al. | |
| 6,871,156 | B2 | 3/2005 | Wallace et al. | |
| 6,881,899 | B1 | 4/2005 | Trangsrud | |
| 6,904,586 | B1 | 6/2005 | Bemanian et al. | |
| 6,907,445 | B2 | 6/2005 | Pellegrino et al. | |
| 6,916,985 | B1 | 7/2005 | Harwood | |
| 6,936,155 | B1 | 8/2005 | Morimitsu et al. | |
| 6,937,926 | B2 | 8/2005 | Lipscomb et al. | |
| D510,044 | S | 9/2005 | Ribeiro et al. | |
| D510,045 | S | 9/2005 | Lipscomb et al. | |
| 6,939,155 | B2 | 9/2005 | Postrel | |
| 6,941,203 | B2 | 9/2005 | Chen | |
| D510,859 | S | 10/2005 | Dixon et al. | |
| 6,957,133 | B1 | 10/2005 | Hunt et al. | |
| 6,978,319 | B1 * | 12/2005 | Rostoker et al. | 709/250 |
| 6,993,421 | B2 | 1/2006 | Pillar et al. | |
| D518,394 | S | 4/2006 | Lipscomb et al. | |
| D519,046 | S | 4/2006 | Lipscomb et al. | |
| D519,859 | S | 5/2006 | Chinnadurai et al. | |
| 7,054,727 | B2 | 5/2006 | Kemp et al. | |
| 7,058,488 | B2 | 6/2006 | Kemp et al. | |
| 7,079,927 | B1 | 7/2006 | Tano et al. | |
| 7,091,440 | B2 | 8/2006 | Gabbianelli et al. | |
| 7,099,750 | B2 | 8/2006 | Miyazawa et al. | |
| 7,113,127 | B1 | 9/2006 | Banet et al. | |
| 7,117,984 | B2 | 10/2006 | Jordison et al. | |
| 7,149,612 | B2 | 12/2006 | Stefani et al. | |
| 7,155,321 | B2 | 12/2006 | Bromley et al. | |
| 7,155,322 | B2 | 12/2006 | Nakahara et al. | |
| 7,208,685 | B2 | 4/2007 | Browning et al. | |
| 7,224,262 | B2 | 5/2007 | Simon et al. | |
| 7,239,945 | B2 | 7/2007 | Hiemer et al. | |
| 7,254,550 | B2 | 8/2007 | Reichwein et al. | |
| 7,302,314 | B2 | 11/2007 | Sommer | |
| 7,305,289 | B2 | 12/2007 | Gessner et al. | |
| 7,350,159 | B2 | 3/2008 | Cancilla et al. | |
| 7,430,465 | B2 | 9/2008 | Liebl et al. | |
| 7,961,746 | B2 * | 6/2011 | Jan et al. | 370/419 |
| 2001/0044677 | A1 | 11/2001 | Bauer et al. | |
| 2002/0007237 | A1 | 1/2002 | Phung et al. | |
| 2003/0158640 | A1 | 8/2003 | Pillar et al. | |
| 2003/0182033 | A1 | 9/2003 | Underdahl et al. | |
| 2004/0044453 | A1 | 3/2004 | Malik et al. | |
| 2004/0065461 | A1 | 4/2004 | Browning et al. | |
| 2004/0083041 | A1 | 4/2004 | Skeen et al. | |
| 2004/0111189 | A1 | 6/2004 | Miyazawa et al. | |
| 2004/0148073 | A1 | 7/2004 | Hawig et al. | |
| 2004/0230356 | A1 | 11/2004 | Namaky | |
| 2005/0043869 | A1 * | 2/2005 | Funkhouser et al. | 701/29 |
| 2005/0096809 | A1 | 5/2005 | Skeen et al. | |
| 2005/0107929 | A1 | 5/2005 | Haydn | |
| 2005/0193252 | A1 | 9/2005 | Cancilla et al. | |
| 2006/0041347 | A1 | 2/2006 | Chinnadurai et al. | |
| 2006/0101311 | A1 | 5/2006 | Lipscomb et al. | |
| 2006/0106514 | A1 | 5/2006 | Liebl et al. | |
| 2007/0244611 | A1 * | 10/2007 | Brozovich | 701/29 |
| 2008/0005600 | A1 * | 1/2008 | Diab et al. | 713/300 |
| 2008/0019341 | A1 * | 1/2008 | Perlman | 370/338 |
| 2008/0086246 | A1 | 4/2008 | Bolt et al. | |
| 2008/0249681 | A1 * | 10/2008 | Bertosa et al. | 701/35 |
| 2008/0255888 | A1 * | 10/2008 | Berkobin et al. | 705/4 |
| 2008/0269975 | A1 * | 10/2008 | Bertosa et al. | 701/29 |
| 2008/0270075 | A1 * | 10/2008 | Bertosa et al. | 702/183 |
| 2009/0063745 | A1 * | 3/2009 | Morris et al. | 710/304 |
| 2009/0157248 | A1 * | 6/2009 | Gilbert | 701/29 |

* cited by examiner

USB ISOLATION FOR VEHICLE COMMUNICATION INTERFACE

FIELD OF THE INVENTION

The present invention relates generally to an automotive diagnostic tool which facilitates data communications between an automobile and an external monitoring appliance, such as a personal computer. More particularly, the present invention relates to electrically isolating the automobile's On Board Diagnostic communication port and the personal computer using a Vehicle Communication Interface (VCI) device situated between the two.

BACKGROUND OF THE INVENTION

On Board Diagnostics II (OBD II) was brought about to monitor an automobile's electronics system by providing a single point interface for diagnostic equipment. For example, an engine control module, a transmission control module and a suspension control module can all be accessed through a single OBD II connector. The OBD II standard was developed as a cooperative effort between the Society of Automotive Engineers (S.A.E.), the EPA and the California Air Resources Board (C.A.R.B.). Its installation and usage was made mandatory on all vehicles sold in the U.S. starting on Jan. 1, 1996 as an attempt to standardized automobile diagnostic testing and monitoring.

The automobile's engine control module manages the engine and optimizes fuel economy and power output while controlling emissions. When the engine control module detects a fault in one its engine sensors, it will illuminate an "check engine" light on the dashboard. A technician can collect information on sensors and actuators for shorts, open circuits, lazy sensors (slow responding) and out-of-range values by attaching a diagnostic device to the OBD II port and retrieve information about the fault.

The automobile's control modules are mini-computers having computer subsystems. There is a central processing unit (CPU), a random access memory (RAM), a read only memory (ROM), data busses and control lines. The ROM contains microcode or firmware, which is a set of instructions especially written for each automobile that are executed by the CPU.

Whenever two or more electronic apparatus are connected via cabling, voltage variations, voltage spikes and ground loops can be introduced and damage the automobile electrical systems and the attached testing equipment. A ground loop is a current, generally unwanted, in a conductor connecting two points that are supposed to be at the same ground potential (voltage), but are actually at different potentials. For example, a ground loop occurs when an automobile's chassis connects to a first earth ground and its ground potential is zero volts. A piece of testing equipment such as engine analyzer also connects to earth ground, but its ground potential is at a positive 5 volts relative to the ground at the chassis. The analyzer's probe ground lead is then attached to the chassis and a difference of 5 volts between the grounds produce a current to flow through the ground wires causing damage to the testing equipment and/or the automobile's electronics. Ground loops can also generate noise into the test system's cabling corrupting data transmissions.

Therefore what is needed is a vehicle control interface device that electrically isolates a vehicle's OBD II communication signals from attached analyzers which is capable of high speed rate transmission.

SUMMARY OF THE INVENTION

The foregoing needs are met, to a great extent, by the present invention, wherein in one embodiment of the present invention, a Vehicle Communication Interface (VCI) connects to an automobile's On Board Diagnostic (OBD II) port and to a diagnostic computer, such as a laptop computer, permitting electrically isolated diagnostic data exchange between the automobile and the laptop.

In an embodiment, the VCI comprises a logic controller attached via an OBD II cable to an OBD II diagnostic port in a vehicle and configured to receive and transmit OBD II signals. An Ethernet controller communicates with the logic controller and an Ethernet to USB controller communicates with a diagnostic device via USB signals. An Ethernet communications transformer is positioned between and providing communication with the Ethernet controller and the Ethernet to USB controller, wherein the Ethernet communications transformer creates a galvanic isolation between the vehicle and diagnostic device.

In another embodiment is for a method of electrically isolating communications between a vehicle's On Board Diagnostic (OBD II) port and a vehicle diagnostic device, comprising the steps of, providing a Vehicle Communication Interface (VCI) device with a logic controller configured to receive OBDII signals from the vehicle's OBDII port and to transmit OBDII signals to the vehicle's OBDII port, receiving OBDII signals from the OBDII port via a data link connector that is in communication with the logic controller, configuring the logic controller to communicate in the communication protocol of the OBDII signal, converting the OBDII signals to an Ethernet signal that can be understood by an Ethernet controller of the VCI, isolating galvanically the OBDII signals and USB signals, wherein the USB signals is received by an Ethernet to USB controller from a remote diagnostic device, the Ethernet to USB controller is located in the VCI and transmitting the converted OBDII signals via the Ethernet to USB controller to the remote diagnostic device.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
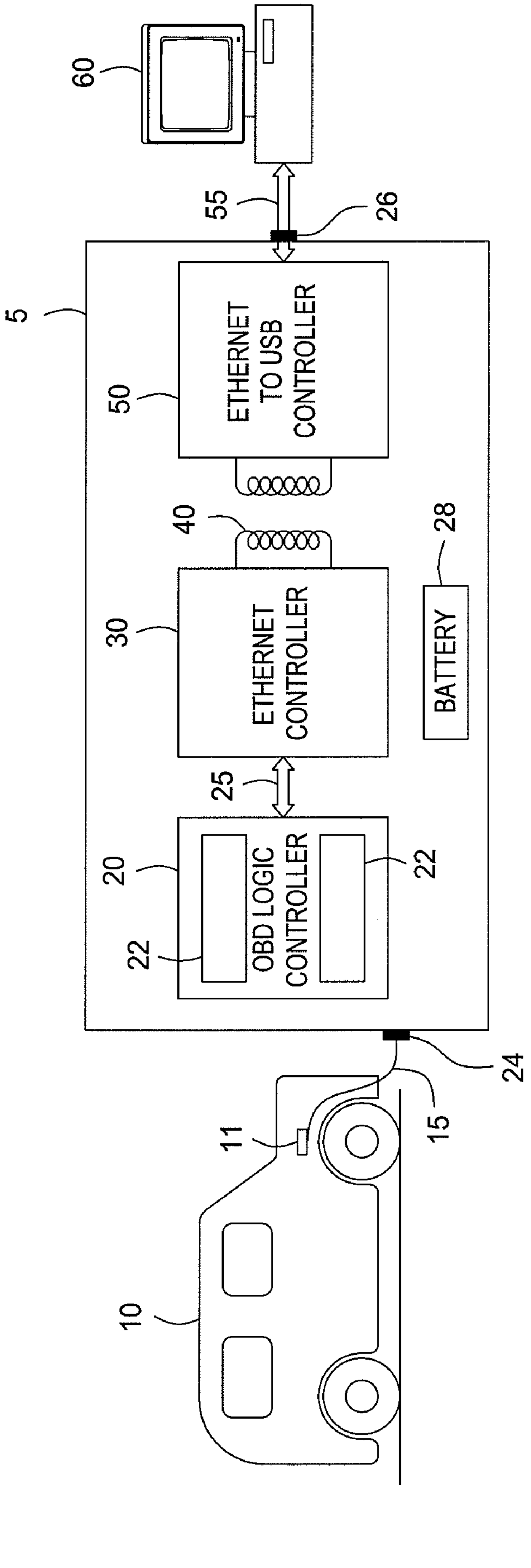
FIG. 1 is an exemplary view illustrating the system's connections of the invention according to an embodiment of the invention.

The On Board Diagnostic (OBD II) to Universal Serial Bus (USB) Vehicle Communication Interface (VCI) will now be described in detail with reference to the attached drawing FIG. 1. in which like reference numerals refer to like parts throughout.

The present invention provides a Vehicle Communication Interface (VCI) 5 which connects to an automobile's 10 On Board Diagnostic (OBD II) port connector via OBD II Cable 15. The OBD II Cable 15 also attaches to VCI's 5 OBD II Logic Controller 20. The OBD II Logic Controller 20 connects to an Ethernet Controller 30 via a bus 25. The Ethernet Controller 30 connects to an Ethernet Communications Transformer 40 that electrically isolates the OBD II signals from the USB signals. The other side of the Ethernet Communications Transformer 40 connects to an USB Controller 50. A USB output 26 from the USB Controller 50 is connected to a computer 60 via USB Cable 55.

The OBD II connector on all newer automobiles is usually found on the driver's side firewall and is a 16-pin (2×8) J1962 connector. On some cars it may be on the front passenger's side firewall or under the hood. The connector has standard pins for power, signal ground and battery ground. Various communication protocols have unique non-conflicting pin assignments on the J1962 connector.

OBD II Signal Protocols

To exchange data with the automobile's OBD II systems, a communications device must use the appropriate OBD II signaling protocol. There are currently five signaling protocols in use, but fortunately, automobile manufacturers tend to utilize only one signaling protocol across their models. A first signaling protocol employs pulse-width modulation over a differential serial bus, while a second employs variable pulse width modulation, each at different baud rates. Two other signaling protocols employ simple serial communications, but at different voltage signal levels. The fifth signaling protocol uses a controller area network, which has complicated packet permission and collision issues.

The OBD II Logic Controller 20 is configured to communicate with the five signaling protocols, but first it must determine what signaling protocol the automobile is employing. This is accomplished by sensing certain lines on the automobile's OBD II connector. In another embodiment, the VCI can try one signaling protocol at a time until the correct protocol is determined. The OBD II Logic Controller 20 then places itself into the appropriate signaling protocol mode. The OBD II Logic Controller 20 can be reprogrammed permitting new signaling protocols to be added as automobile manufactures introduce them.

The Ethernet Controller 30 is a 10/100 Ethernet controller device designed for embedded applications. It includes an integrated Ethernet Medium Access Control (MAC) and Physical (PHY) functionality along with large transmit and receive data First-In-First-Outs (FIFOs) to accommodate high bandwidth, high-latency applications. The VCI can also incorporate faster Ethernet controllers, such as a gigabit Ethernet controller, permitting even faster data rate exchange.

The main function of the OBD II Logic Controller 20 is to translate the automobile's OBD II signals into a data format understood by the Ethernet Controller 30. It also translates Ethernet Controller's 30 data signals into the format understood by the OBD II Logic Controller 20. The Ethernet communications port of the Ethernet Controller 30 is applied to a first side of the Ethernet Communications Transformer 40.

Figure 4:
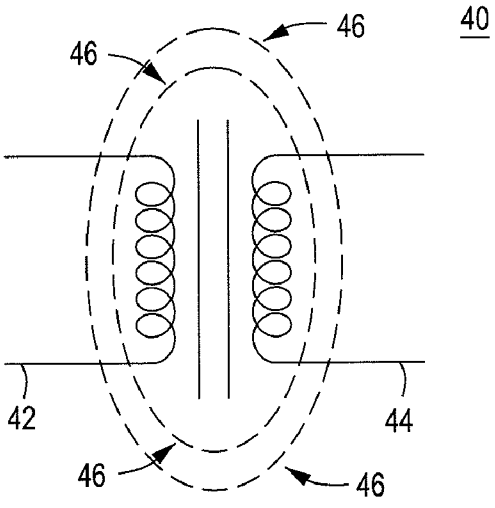
FIG. 4 is an exemplary view illustrating a communications transformer according to an embodiment of the invention.

FIG. 4. illustrates the Ethernet Communications Transformer 40 according to an embodiment of the invention. The Ethernet Communications Transformer 40 is a telecommunications transformer consisting of two closely coupled coils of wire. A first coil 42 of the Ethernet Communications Transformer 40 is commonly labeled as the primary winding and the second coil 44 is labeled the secondary winding. When a communication signal, such as an Ethernet signal is applied to the first coil 42 of Ethernet Communications Transformer 40, it creates a changing magnetic field 46 around the first coil 42. The second coil 44 is in the vicinity of first coil's 42 changing magnetic field 46 and due to Faraday's law of induction, an electromotive force is created in the second coil 44, which is directly proportional to the Ethernet communications signal. An advantage of using the Ethernet Communications Transformer 40 is that it electrically isolates two electronic signals because there is no direct galvanic path or actual connection between the first coil 42 and second coil 44. The other side of the Ethernet Communications Transformer 40 is connected to an Ethernet port of the Ethernet to USB Controller 50.

The Ethernet to USB Controller 50 is a 10/100 Fast Ethernet controller with embedded Static random access memory (SRAM) for packet buffering. It has an USB interface to communicate with USB hosts, such as computer 60 via USB cable 60 which is connectively attached to VCI 5.

The VCI 5 contains two embedded controllers, which are the Ethernet Controller 30 and the Ethernet to USB Controller 50. The OBD II Logic Controller 20 is comprised of complex programmable logic devices (CPLDs) 22. The CPLD 22 contains macro cells of programmable logic device semiconductors used to implement logic functions called "logic blocks" and can be programmed to emulate many logic devices.

The VCI 5 can be powered from an internal battery 28. The battery 28 can be an alkaline battery or a rechargeable battery which obtains its recharging power from either the USB connector 26 or the OBD II Cable 15. The VCI may also operate without a battery and obtain its power from the USB connector 26. In one embodiment, the VCI can be powered through the OBD II cable 15 or through an external power supply (AC or DC).

VCI Initialization

Figure 2:
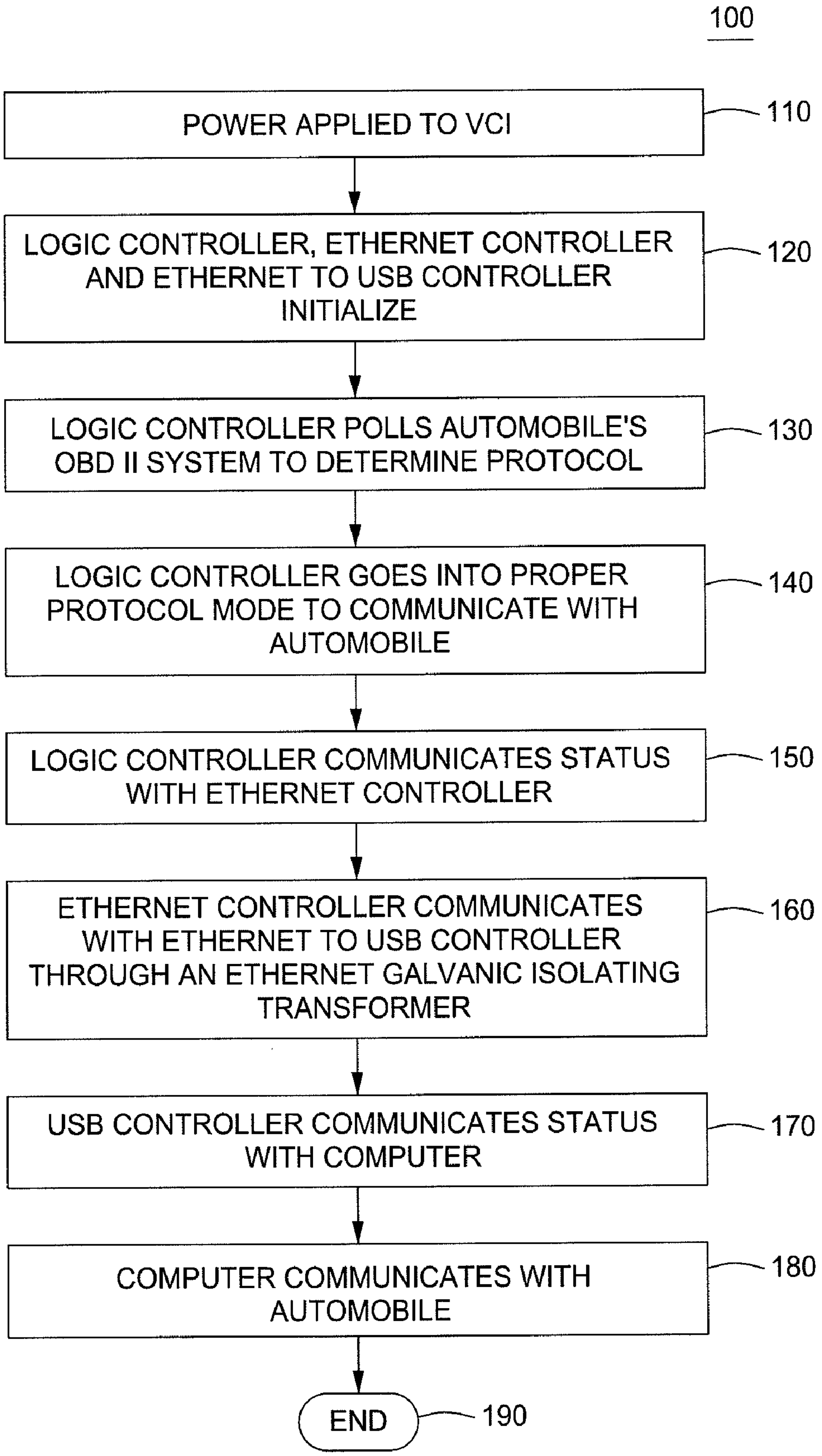
FIG. 2 is a flowchart illustrating steps that are involved in the VCI's initialization.

The two embedded controllers and the CPLDs 22 need to be initialized at VCI's 5 startup. A flowchart of the steps involved in the VCI's Initialization 100 are illustrated in FIG. 2. Power is applied to the VCI 5 at step 110. The OBD II Logic Controller 20, Ethernet Controller 30 and USB Controller 50 begin their respective start ups at step 120. The OBD II Logic Controller 20 determines the protocol in use at step 130 and sets itself into the matching mode at step 140.

The protocol information and the OBD II Logic Controller's status is passed over to the Ethernet Controller 30 at step 150. The Ethernet Controller passes its status and the protocol information to the USB Controller 50 through the Ethernet Communications Transformer 40 at step 160. The Ethernet Communications Transformer 40 provides galvanic isolation between the USB Controller 50 and the Ethernet Communications Transformer 40, thereby isolating the OBD II signals and the USB signals. The USB Controller 50 communicates with the computer 60 at step 170, permitting computer 60 to communicate with automobile 10.

In operation, the technician connects the OBD II cable 15 into the diagnostic port 11 of the automobile 10. The other end of the OBD II cable 15 attaches to the OBD II connector 24 on the VCI 5. The computer 60 is connected to the VCI 5 via USB cable 55 and is connected to the VCI at USB port 26.

As power is applied, the VCI 5 initializes and tries to ascertain the OBD II signaling protocol that the automobile 10 is employing. After initialization, computer 60 sends an automobile status query. The Ethernet to USB Controller 50 changes USB protocol data to Ethernet data and presents it to the first coil 42 of the Ethernet Transformer 40. As discussed above, the Ethernet Communications Transformer 40 electrically isolates two electronic signals because there is no direct galvanic path or actual connection between its input and output.

The data is retrieved from the second coil 44 of the Ethernet Transformer 40 and is applied to the Ethernet Controller 30. An output of the Ethernet Controller 30 is applied to the OBD II Logic Controller 20, which communicates with the automobile's 60 OBD II system. The VCI 5 is duplex communication device, it permits two way communication between the automobile 10 and the computer 60, therefore, the reverse communication path is through the same components as the forward path.

In an embodiment of the present invention, the Ethernet Transformer 40 is replaced with an optical coupler to electrically isolate the Ethernet signal's path. The optical coupler utilizes a light emitting diode (LED) and a phototransistor, separated so that light may travel across a barrier but electrical current may not. When an electrical signal, such as a Ethernet signal is applied to the input of the optical coupler, its lights a LED. The phototransistor's light sensor then activates, and a corresponding electrical signal is generated at the output.

Figure 3:
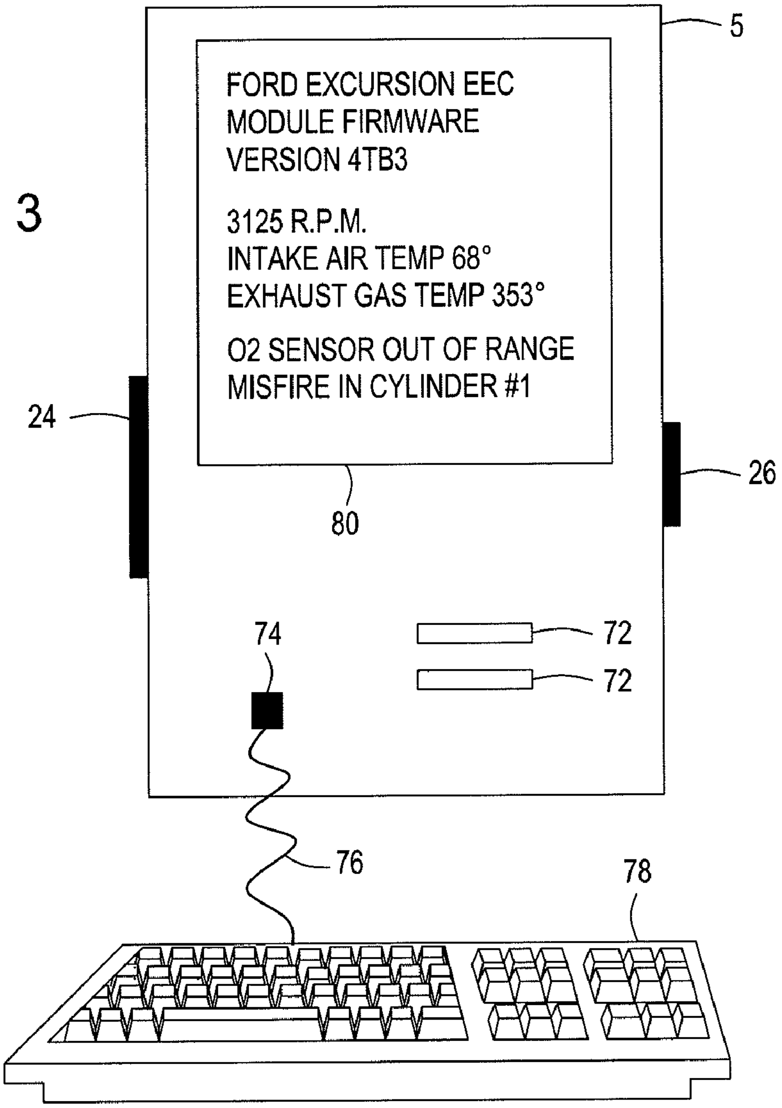
FIG. 3 illustrates an exemplary version of a VCI suitable for carrying out the functions of an embodiment of the invention with or without a personal computer.

FIG. 3 is another embodiment of the present invention, wherein the VCI 5 can be used with or without a computer 60. It has a detachable keyboard 78 connects to the VCI 5 via a keyboard cable 76. The OBD II Cable 15 connects the automobile 10 to the VCI at VCI-OBD II Connector 24, but the VCI's 5 USB Connector 26 need not be connected to computer 60 via the USB cable 55. The keyboard cable 76 plugs in a keyboard connector 74 of the VCI 5. A display 80 can also attachable or can be a part of the VCI 5. This embodiment permits a user to monitor an automobile without a computer, while protecting the VCI and automobile from any potential ground loops.

In still yet another embodiment, the VCI 5 will have a removable storage memory slot 72, such as a Secure Digital (SD) Card slot. The VCI stores collected performance data on the removable storage, which can be transferred to another computer with a removable storage slot. Removable storage memory cards are ubiquitous and easily provide transportable storage of up to 32 Gigabits or more. In addition to storing automobile performance data, the removable storage memory can be loaded with new firmware for the automobile's OBD II computers. The VCI can push programmatic instructions into the automobile's OBD II computers via the OBD II interface.

In an additional embodiment, the VCI 5 connects to an automobile's 10 Ethernet port instead of the OBD II port. In this configuration, the OBD II Logic Controller 20 is bypassed and data is presented directly to a first Ethernet port of Ethernet Controller 30. A second Ethernet port of Ethernet Controller 30 is nonconductively coupled to the Ethernet to USB Controller 50 through Ethernet Communications Transformer 40. The USB port on the Ethernet to USB controller 50 could then be attached to a computer 60, an Ethernet network or the Internet.

In still yet another embodiment, a display 80 and keyboard 78 would be incorporated into the VCI's 5 Ethernet version as described above, permitting the diagnostician to analyze the automobile 10 without a computer.

Also, although the VCI is useful to the automotive industry, without much design change, the VCI can also be used in any industry that needs to electrically isolate signals. Most modern microprocessors and microcontrollers provide a plurality of serial and parallel data ports to enable them to attach to many input/output (I/O) devices. For example, an assembly line that needs communication signaling between each machine on the line, could have a "pick and place" robot electrically isolated from the rest of the assembly line's motor controllers. This would eliminate the possibility of ground loops that might destroy static sensitive components being inserted by the "pick and place" robot.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A Vehicle Communication Interface (VCI), comprising:

a logic controller configured to communicate with an OBD II diagnostic port in a vehicle via an OBD II cable and receive and transmit OBD II signals;

an Ethernet controller in communication with the logic controller;

an Ethernet to USB controller that communicates with a diagnostic device via USB signals and with the Ethernet controller; and an Ethernet communications transformer positioned between and communicates with the Ethernet controller and the Ethernet to USB controller, wherein the Ethernet communications transformer creates a galvanic isolation between the vehicle and the diagnostic device.

2. The VCI of claim 1, wherein the VCI prevents a ground loop between the diagnostic device and the vehicle.

3. The VCI of claim 1, wherein the logic controller includes complex programmable logic devices.

4. The VCI of claim 1, wherein the Ethernet communications transformer isolates the voltage potential of the OBD II signals and a voltage potential from the USB signals.

5. The VCI of claim 1, wherein logic controller is programmed with new signaling protocols as the protocols are updated by vehicle manufacturers.

6. The VCI of claim 1, wherein the logic controller translates the OBD II signals into a format understood by the Ethernet controller and vice versa.

7. The VCI of claim 1, wherein the diagnostic device is a personal computer.

8. The VCI of claim 1, wherein signals between the vehicle and the diagnostic device are communicated via the induction properties of the Ethernet communications transformer.

9. The VCI of claim 1, wherein the VCI is powered by either an external power source or through a vehicle battery via the OBD II diagnostic port.

10. The VCI of claim 9, wherein the VCI includes a keyboard and display allowing operation with or without the diagnostic device.

11. A method of electrically isolating communications between a vehicle's On Board Diagnostic (OBD II) port and a vehicle diagnostic device, comprising the steps of:

providing a Vehicle Communication Interface (VCI) device with a logic controller configured to receive OBD II signals from the vehicle's OBD II port and to transmit the OBD II signals to the vehicle's OBD II port;

receiving the OBD II signals from the vehicle's OBD II port via a data link connector that is in communication with the logic controller;

configuring the logic controller to communicate in a communication protocol of the OBD II signals;

converting the OBD II signals to an Ethernet signal that is understood by an Ethernet controller of the VCI device;

isolating galvanically the OBD II signals and USB signals, wherein the USB signals is received by an Ethernet to USB controller from the vehicle diagnostic device, the Ethernet to USB controller is located in the VCI device; and transmitting the converted OBD II signals via the Ethernet to USB controller to the vehicle diagnostic device.

12. The method of claim 11, wherein isolating galvanically the OBD II and the USB signals prevents a ground loop between the vehicle diagnostic device and a vehicle.

13. The method of claim 11, further comprising converting the Ethernet signals to the OBD II signals that is understood by the Ethernet controller of the VCI device.

14. The method of claim 11, further comprising communicating signals between a vehicle and the vehicle diagnostic device via induction properties of an Ethernet communications transformer.

15. A Vehicle Communication Interface (VCI), comprising:

means for processing configured to communicate via an OBD II cable with an OBD II diagnostic port in a vehicle and configured to receive and transmit OBD II signals;

means for controlling Ethernet communications configured to communicate with the means for processing;

means for controlling Ethernet to USB communications configured to communicate with a diagnostic device via USB signals and the means for controlling Ethernet communications; and means for isolating signals configured to be positioned between and communicate with the means for controlling Ethernet communications and the means for controlling Ethernet to USB communications, wherein the means for isolating signals creates a galvanic isolation between the vehicle and the diagnostic device.

16. The VCI of claim 15, wherein the VCI prevents a ground loop between the diagnostic device and the vehicle.

17. The VCI of claim 15, wherein the means for processing includes complex programmable logic devices.

18. The VCI of claim 15, wherein the means for isolating signals isolates the voltage potential of the OBD II signals and a voltage potential from the USB signals.

19. The VCI of claim 15, wherein the means for processing is programmed with new signaling protocols as they are updated by vehicle manufacturers.

20. The VCI of claim 15, wherein the means for processing translates the OBD II signals into a format understood by the means for controlling Ethernet communications and vice versa.

21. The VCI of claim 15, wherein the diagnostic device is a personal computer.

22. The VCI of claim 15, wherein signals between the vehicle and the diagnostic device are communicated via induction properties of the means for isolating signals.

23. The VCI of claim 15, wherein the VCI is powered by an internal means for powering.

24. The VCI of claim 15, wherein the VCI is powered by an external means for powering.

25. The VCI of claim 15, wherein the VCI includes a means for inputting and a means for displaying that allows operation with or without the diagnostic device.

* * * * *